United States Patent
Johnson et al.

(10) Patent No.: US 6,822,965 B1
(45) Date of Patent: Nov. 23, 2004

(54) APPROXIMATE STATE CONTROL MECHANISM

(75) Inventors: Ian David Johnson, Moseley (GB); Paul Howarth, Ancoats (GB)

(73) Assignee: Xyratex Technology Limited, Hampshire (GB)

( * ) Notice: Subject to any disclaimer, the term of this patent is extended or adjusted under 35 U.S.C. 154(b) by 0 days.

(21) Appl. No.: 09/869,085

(22) PCT Filed: Dec. 14, 1999

(86) PCT No.: PCT/GB99/04231

§ 371 (c)(1),
(2), (4) Date: Jun. 20, 2001

(87) PCT Pub. No.: WO00/38377

PCT Pub. Date: Jun. 29, 2000

(30) Foreign Application Priority Data

Dec. 22, 1998 (GB) .............................. 9828142

(51) Int. Cl.⁷ .............................................. H04L 12/28
(52) U.S. Cl. ...................................... 370/398; 370/429
(58) Field of Search .............................. 370/230, 230.1, 370/231, 232, 233, 234, 235, 236, 412, 413, 414, 415, 416, 417, 418, 419, 428, 429, 398; 710/52, 57

(56) References Cited

U.S. PATENT DOCUMENTS

| | | | | |
|---|---|---|---|---|
| 5,448,559 A | * | 9/1995 | Hayter et al. ................ | 370/398 |
| 5,577,035 A | * | 11/1996 | Hayter et al. ............ | 370/395.4 |
| 5,796,719 A | * | 8/1998 | Peris et al. .................. | 370/231 |
| 6,307,852 B1 | * | 10/2001 | Fisher et al. ................ | 370/352 |
| 6,490,248 B1 | * | 12/2002 | Shimojo ..................... | 370/229 |

FOREIGN PATENT DOCUMENTS

| | | |
|---|---|---|
| EP | 0624015 | 9/1994 |
| EP | 0860960 | 8/1998 |
| WO | 9714240 | 5/1997 |

* cited by examiner

Primary Examiner—Bob A. Phunkulh
(74) Attorney, Agent, or Firm—Pillsbury Winthrop LLP

(57) ABSTRACT

A data packet switching system having a central controller and a number of peripheral controllers each incorporating at least one queue for storing packets of information received from a peripheral data packet source. Each queue in each peripheral controller includes a queue size detection logic adapted to communicate to the central controller the approximate state of the size of the corresponding queue. The scale for the approximate state being arranged to be empty, nearly empty, active, busy, very busy, nearly full and full.

5 Claims, 3 Drawing Sheets

APPROXIMATE STATE CONTROL MECHANISM

BACKGROUND OF THE INVENTION

Figure 1:
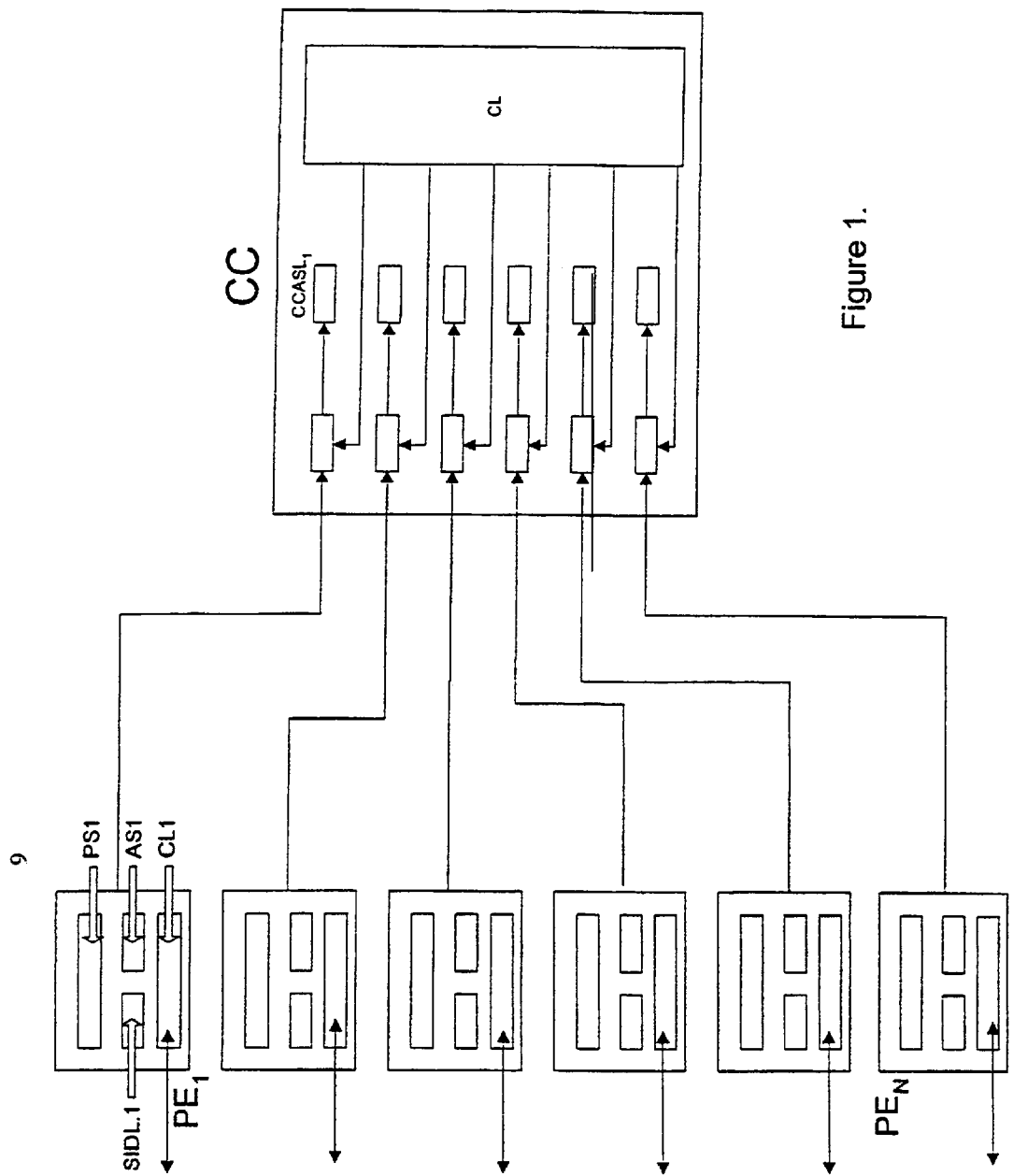

The present invention relates to data handling systems and is more particularly concerned with the handling of data packets by peripheral controllers acting under the control of a central controller.

An example of such a system would be a data switching fabric (such as that described in International Patent Application PCT/GB99/03748), in which the peripheral controllers deal with the transmission and reception of packets of data, storing the packets in queues prior to their passage through the switching fabric. The central controller uses information about the size of the queues to influence how it creates connections within the switch fabric, generally aiming to keep the queue sizes as small as possible. In such a system, there could be a very large number of queues to keep track of, since there could be separate queues for each source/destination pair and also separate queues for different priority levels of packets. Keeping a copy of the exact size of each of these queues within the central controller might not be possible due to space limitations in the implementation of the central controller.

It is an object of the present invention to address the above issues.

EP 0624015A discloses an asynchronous transfer mode (ATM) switch having a plurality of input port servers connected to output port servers via a switch. The input port servers include buffers for cells. Whenever the number of cells in the queue reaches a threshold a request for bandwidth allocation is transmitted to the output port server. The output port server compares the requested bandwidth with the available bandwidth, and grants the bandwidth if sufficient bandwidth is available.

EP 0860960A discloses an ATM switch in which both input ports and output ports maintain buffers. A control unit is informed of the number of cells in the queues of the input buffers, and also receives information about the approximate number of cells in the output buffers.

The present invention proposes a data packet handling system having a plurality of peripheral controllers (PE1, PEN), each peripheral controller including at least one queue arranged to store packets of information received from a peripheral data packet source connected to that peripheral controller (PE1, PEN), each peripheral controller (PE1, PEN) having for each queue a corresponding detection means (PC) for performing a queue size detection logic to detect when the size of that queue traverses one of a plurality of queue size thresholds, and thereupon to transmit a corresponding threshold traversing signal;
characterized in that:
  the system further includes a central controller (CC);
  the detection means (PC) is arranged to transmit the threshold traversing signals to the central controller (CC); and
  the central controller (CC) includes for each queue in each of the peripheral controllers (PE1, PEN) a corresponding queue size detection arrangement (CCASL) for detecting the size of the corresponding queue using the threshold traversing signals from the corresponding peripheral controller (PE1, PEN).

In the case of the data switching fabric described above, it is not actually necessary for the central controller to know the exact size of the queues in the peripheral controllers; an approximate scale along the lines of "Empty", "Nearly Empty", "Active", "Busy", "Very Busy", "Nearly Full" and "Full" could be sufficient to base scheduling and arbitration decisions on. Representing this limited number of states in digital logic requires significantly less space in the central controller than representing the exact, precise size of the queues. The mapping between the exact and approximate queue sizes is performed in the peripheral controllers, each of which has a much smaller number of queues to manage and, therefore, the size of the logic required to hold the state and mapping information is less of an issue there.

Figure 2:
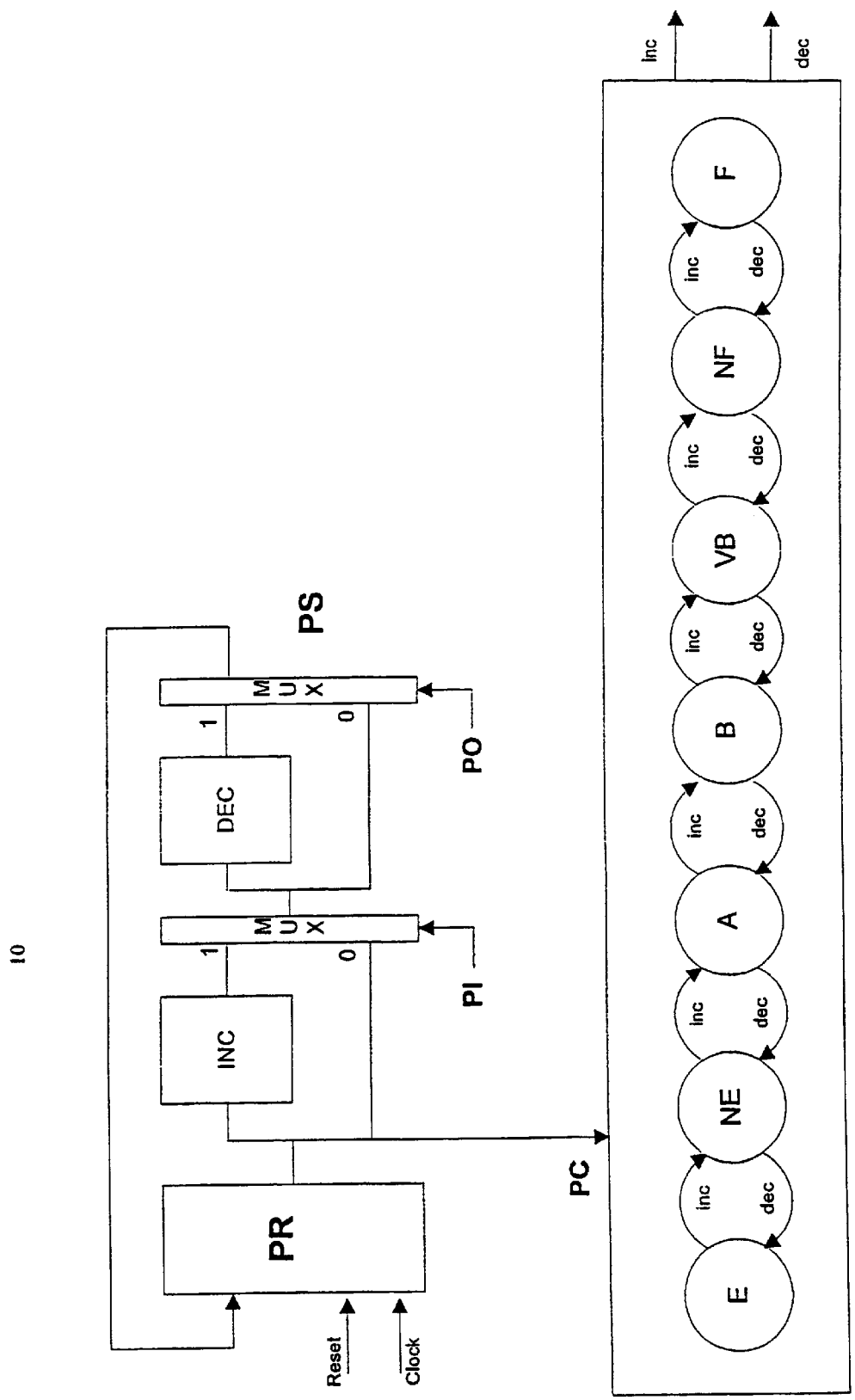
Figure 3:
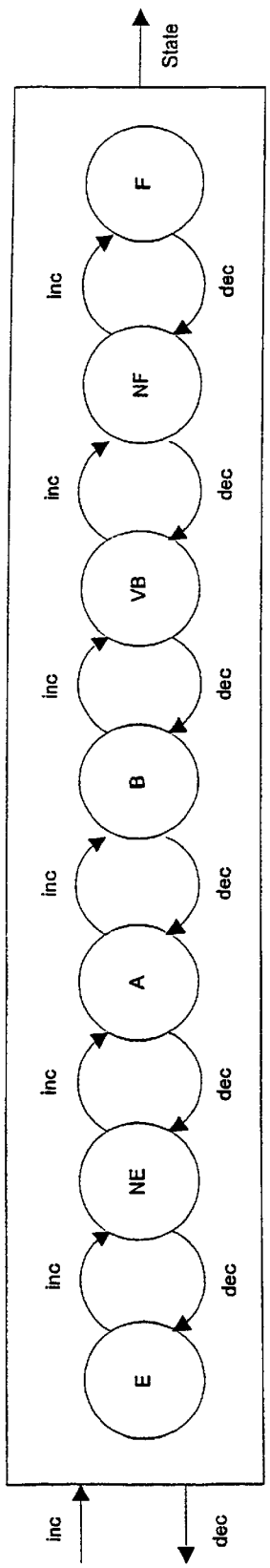

The invention will be more readily understood from the following description of one embodiment which should be read in conjunction with the accompanying drawings. Of the drawings:

FIG. 1 shows the interconnection between peripheral controllers and the central controller for a data handling system according to one embodiment of the invention FIG. 2 shows in block schematic form the queue state control logic in a peripheral controller whereas FIG. 3 shows in schematic form the approximate state control logic in the central controller.

FIG. 1 shows the interconnection between the peripheral controllers PE1 to PEN and the central controller CC. Typically the peripheral controllers PE1 to PEN equate to the ingress and corresponding egress routers of co-pending International Patent Application PCT/GB99/03748, whereas the central controller CC equates to the switch controller. In operation the peripheral controllers assemble the incoming packets of information into virtual output queues which are also priority segregated. The central controller requires to know the levels (number of packets stored in each queue) of the queue so that the scheduling and arbitration function can be performed efficiently in allocating the switch fabric connections.

Contained within each peripheral controller is a queue state control logic consisting of a precise state counter PS1 together with an approximate state logic AS1 State increment/decrement logic SIDL1 and packet control logic CL1. The precise state counter PS and the approximate state logic AS are shown in schematic form in FIG. 2.

FIG. 2 shows the queue state control logic PS in a peripheral controller for a single queue. The queue state control logic consists of a register PR which holds the precise queue size of the associated queue. The precise state register PR feeds the increment/decrement logic and the approximate state control logic AS. The state of the precise queue register PR at each switching clock cycle defines the actual state of the associated input queue in the corresponding peripheral controller.

The queue state control logic operates such that the precise count held in the register PR is incremented by one through the incrementer INC as each packet arrives at the peripheral controller, indicated by an instruction on lead PI, and is decremented through the decrementer DEC by one as each packet departs from the peripheral controller, indicated by an instruction on PO.

The multiplexors MUXI and MUXD operate by passing the output of the incrementer INC and the decrementer DEC respectively when the instructions PI and PO are present or the output from the queue state register PR directly when these instructions PI and PO are absent.

The precise count PC is also applied to the approximate state machine AS which is arranged to detect seven thresholds of Empty E (i.e. count=0), Nearly Empty NE (i.e. count>0), Active A (i.e. count>threshold 1), Busy B (i.e. count>threshold 2), Very Busy VB (i.e. count>threshold 3), Nearly Full NF (i.e. count>threshold 4) and Full F (i.e. count=maximum).

As each threshold is traversed an increment CCI or decrement CCD instruction is sent to the central controller CC which, as is shown in FIG. 3, replicates in its approximate state logic CCASL the approximate state conditions created in the corresponding peripheral controller queue state control logic of Empty E, Nearly Empty NE, Active A, Busy B, Very Busy VB, Nearly Full NF and Full F.

The two main advantages of this system are:
1. The amount of information needed to be held centrally is significantly reduced, enabling the creation of larger systems than would otherwise be possible, and
2. The lack of "actual" queue sizes in the central controller provides a further degree of scalability. The same central controller could be used for systems designed using peripheral controllers that handled queue sizes up to 100 packets and for systems whose peripheral controllers handled queues of millions of packets. Since it is the peripheral controllers that define the mapping between the precise and approximate states, the central controller does not need to be changed to implement larger or smaller maximum queue sizes.

The invention typically finds application in the egress control unit of a data switching system of the type disclosed in International Patent Application The approximate state control mechanism described above is a slight generalisation of a specific implementation. In practice there are sixteen "approximate states", which represent "precise states" ranging from 0 to 1024 packets of information in the queues. It is a requirement of the design of the practical implementation that the central controller does not attempt to create connections for packets that do not exist. Such a situation could be possible due to the time delay inherent in the approximate state control mechanism described above. For instance, when the central controller CC creates a connection for the last packet in a queue, there is a delay from the time when the peripheral controller such as PE1 sends that packet (reducing the size of its queue to zero) to when the central controller CC discovers that the queue size for that peripheral controller PE1 has gone down, i.e. when the CCD instruction reaches the central controller CC. During this time, the central controller CC might create another connection based on the erroneous assumption that the queue was not empty; the peripheral controller PE1 would then be told to send a packet it did not have.

The way this problem is circumvented is to split the approximate states into two ranges, namely "exact" and "fuzzy". In the "exact" range, which is at the low queue size end of the scale, there is a one for one mapping between the precise and approximate queue states, e.g. an approximate state of three means that there are exactly three packets in that queue. In the "fuzzy" range, a single "approximate" state represents a range of different "precise" states as already described. The advantage of doing this is that the central controller CC can now keep track itself of the precise state of the peripheral controllers at the low queue size end of the range (the area that matters); when it creates a connection, it can decrement the approximate state directly itself without having to wait to be told to do so by the peripheral controller. Under these circumstances, the central controller CC does not create connections for non-existent packets. Furthermore, in the "exact" range, there is no need for the peripheral controller to even send the CCD instructions as the central controller CC will already have decremented its copy of the approximate state. This reduces the bandwidth required on the interface between the peripheral controller PE1–PEN and central controller CC.

A further alternative embodiment can be envisaged. Instead of sending CC1 and CCD instructions from the peripheral controller to the central controller when the state changes, the actual state can be sent. This requires very little, if any, extra bandwidth on the interface between the two and makes recovery from errors on the interface much simpler.

In the first embodiment, if there is an error on the interface causing the CCI or CCD instruction to become corrupted (and this error is detected), that instruction must either be re-sent or a resynchronisation must take place (the actual state is sent). Another error during this error recovery procedure would mean yet another resend etc. If the error is not detected, the central CC and peripheral controllers PE1–PEN will be out of step with each other.

In the further alternative embodiment, the actual approximate state is sent whenever there is a change in state. If an error occurs on the interface, a simple resend is all that is required. If a further error occurs, only a single resend is still necessary to restore the status quo. Furthermore, if the error is not detected, it will be corrected anyway next time the state changes at the peripheral controller such as PE1 as it will send the correct new state to the central controller CC as the update message.

We claim:

1. A data packet handling system comprising a plurality of peripheral controllers, each peripheral controller including at least one queue arranged to store packets of information received from a peripheral data packet source connected to that peripheral controller, each peripheral controller having for each queue a corresponding detection means for performing a queue size detection logic to detect when the size of that queue traverses one of a plurality of queue size thresholds, and thereupon to transmit a corresponding threshold traversing signal;

wherein the system further includes a central controller;

the detection means is arranged to transmit the threshold traversing signals to the central controller; and the central controller includes for each queue in each of the peripheral controllers a corresponding queue size detection arrangement for detecting the size of the corresponding queue using the threshold traversing signals from the corresponding peripheral controller.

2. The data packet handling system as claimed in claim 1, wherein each peripheral controller includes a register for each queue in that peripheral controller, each register being arranged to store the size of the corresponding queue, the peripheral controller being arranged to increment the register upon the arrival of a packet into the corresponding queue and to decrement the register upon the departure of a packet from the corresponding queue, and the corresponding detection means being arranged to perform the queue size detection logic based on the size stored in the register.

3. The data packet handling system as claimed in claim 1, wherein the queue size thresholds define transitions between size ranges of each queue which are respectively labelled empty, nearly empty, active, busy, very busy, nearly full and full.

4. The data packet handling system as claimed in claim 3, wherein the size ranges of each queue which are respectively labelled empty and nearly empty, only comprehend one possible queue size.

5. The data packet handling system as claimed in claim 1, wherein the threshold traversing signal varies with the size of the queue.

* * * * *